(12) United States Patent
Kanda et al.

(10) Patent No.: US 7,154,832 B2
(45) Date of Patent: Dec. 26, 2006

(54) JUDGEMENT OF OPTICAL DISC TYPE BASED ON CHANGES OF ROTATING SPEED OF A DISC

(75) Inventors: Yoshihiro Kanda, Osaka (JP); Takeharu Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 566 days.

(21) Appl. No.: 10/317,042

(22) Filed: Dec. 12, 2002

(65) Prior Publication Data
US 2003/0123358 A1 Jul. 3, 2003

(30) Foreign Application Priority Data
Dec. 13, 2001 (JP) ............................. 2001-380012

(51) Int. Cl.
*G11B 7/00* (2006.01)
(52) U.S. Cl. ................................................. 369/53.22
(58) Field of Classification Search .................. None
See application file for complete search history.

(56) References Cited

U.S. PATENT DOCUMENTS 5,764,610 A * 6/1998 Yoshida et al. .......... 369/53.22
6,442,115 B1 * 8/2002 Shimoda et al. ......... 369/47.28
2002/0003764 A1 * 1/2002 Osada ...................... 369/53.34
2002/0080701 A1 * 6/2002 Nakajima ................. 369/53.22
2002/0110059 A1 * 8/2002 Usui et al. ................ 369/47.28
2002/0167874 A1 * 11/2002 Hayashi .................... 369/44.13

FOREIGN PATENT DOCUMENTS

JP 4-123320 4/1992
JP 2000-322742 11/2000

* cited by examiner

*Primary Examiner*—Wayne Young
*Assistant Examiner*—Lixi Chow
(74) *Attorney, Agent, or Firm*—Wenderoth, Lind & Ponack, L.L.P.

(57) ABSTRACT

A type of disc is judged at high reliability irrespective of a presence of information record or magnitude of disc eccentricity. A reproduction apparatus judges the type of an optical disc to reproduce information recorded on tracks of the optical disc. The disc is classified as a type of read-only optical discs whose tracks are formed with pits and as a type of recordable optical discs whose tracks are formed with wobbling grooves. The apparatus includes a motor which rotates the optical disc, a head which irradiates the tracks of the optical disc rotated by the motor with an optical beam and outputs two detection signals corresponding to reflected light from the optical disc, and a controller which judges the type of the optical disc according to changes of a period of a specific signal contained in a push-pull signal generated from the two detection signals by varying a rotating speed of the motor.

13 Claims, 8 Drawing Sheets

JUDGEMENT OF OPTICAL DISC TYPE BASED ON CHANGES OF ROTATING SPEED OF A DISC

BACKGROUND OF THE INVENTION

1. Field of the Invention

The present invention relates to a technique for distinguishing between recordable optical discs and read-only optical discs.

2. Description of Related Art

In recent years, in an optical disc field, recordable optical discs with reproduction compatibility with read-only optical discs have been developed. Since recordable optical discs have recording capacity equivalent to read-only optical discs, they have been attracting people's attention and gaining popularity as recording media that satisfy growing requests for increased capacity in recent years. In addition, although there exist recordable optical discs which have no reproduction compatibility with read-only optical discs, many of recording/reproduction apparatus are configured to reproduce both optical discs. For examples of these types of recordable optical discs, DVD-R/RW and DVD-RAM are known.

On the other hand, as the popularity of recordable optical discs increases, a problem has occurred that information recorded in read-only optical discs is copied into recordable optical discs as it is and thus, a copyright related to the information is infringed. For measures against this problem, a technique to add ID information to read-only optical discs to distinguish between read-only optical discs and recordable optical discs by determining whether discs have the ID information or not has been thought up. However, according to the technique, it is impossible to cope with the case in which ID information is copied.

Therefore, another technique for distinguishing between read-only optical discs and recordable optical discs has been developed, in which discs are determined, not by ID information, but by a difference of physical characteristics of optical discs themselves. To specifically explain physical characteristics of optical discs, first of all, in read-only optical discs, pits and spaces are arranged along spiral data recording tracks. By the pits and spaces, information is recorded. On the other hand, in the recordable optical discs, spirally built grooves or lands intervened between grooves, recording marks and spaces are arranged. Information is recorded by the recording marks and spaces. The grooves of recordable optical discs are formed in wobbling form at a frequency one-several-hundredth of data reproduction speed, and recording clocks are generated based on the frequency. In addition, by the groove wobbling, address information on the optical disc is embedded.

The difference between read-only optical discs and recordable optical discs lies in whether the wobbling tracks as described above exist on the optical disc or not. Therefore, by detecting such wobbling tracks, it is possible to judge whether the disc is recordable or read-only. If an optical disc to be reproduced is judged to be recordable one, and on the recordable optical disc, information whose copyright must be protected is recorded, reproduction of the information on the disc is prohibited. Therefore, copyright can be definitely protected.

Furthermore, because optical disc drives of recent years can record/reproduce information for optical discs of various format specifications, it is extremely useful to distinguish between read-only optical discs and recordable optical discs from viewpoints other than copyright protection. For this distinguishing technique, a technique for detecting wobbles of grooves located on recordable optical discs (see Japanese Laid-open Patent Publication No. 4-123320) and a technique for determining recordable optical discs by measuring the groove wobbling frequency (see Japanese Laid-open Patent Publication No. 2000-322742) have been known.

FIG. 9 is a block diagram showing a configuration of conventional reproduction apparatus 50. Reproduction apparatus 50 detects whether data recording track 2 on optical disc 1 wobbles or not. Reproduction apparatus 50 includes disc motor 3 which rotates optical disc 1, optical head 4 which irradiates optical disc 1 with optical beam and receives reflected light, light receiving element 5 which is located inside optical head 4 and receives reflected light from optical disc 1, transfer mechanism 6 which transfers optical head 4 in radial direction of optical disc 1, and linear speed control section 7 which controls reproduction linear velocity by controlling disc motor 3 and transfer mechanism 6. Reproduction apparatus 50 further includes push-pull signal generator 8 which generates a push-pull signal based on a difference of output signals of light-receiving element 5, band pass filter 9 that only passes a specified frequency component of the push-pull signal outputted from push-pull signal generator 8, clock generator 11 which supplies measured clocks to frequency measuring counter 10, and arithmetic section 12 which carries out arithmetic processing on periodic data measured by period measuring counter 10.

In the push-pull signal generated by push-pull signal generator 8 of reproduction apparatus 50, wobbling frequency component is contained in the case that data recording track 2 wobbles. Band pass filter 9 extracts this frequency component. Reproduction apparatus 50 further includes judging section 13 which determines whether data recording track 2 wobbles or not by the arithmetic results of arithmetic section 12 and outputs the judgment results. Based on the judgment results, the judging section determines whether data recording track 2 on optical disc 1 wobbles or not, that is, whether optical disc 1 is recordable or read-only.

However, in the event that the recordable optical disc is, for example, DVD-R/RW, there are some cases in which reproduction apparatus 50 erroneously judges the recordable optical disc to be read-only or in which reproduction apparatus 50 is unable to judge a type of the disc. The reasons are as follows. First of all, because in DVD-R/RW, pits called land pre-pits which are formed at lands exist, the push-pull signal output cannot be detected as a specified sine wave. In addition, when recording marks are formed in grooves, a signal-to-noise ratio (S/N ratio) of the push-pull signal is extremely degraded due to influences of the recording marks. Consequently, jitters of output from band pass filter 9 increase. Then, a difference between jitters of the recordable optical discs and read-only optical discs decrease. Consequently, it becomes difficult to set a threshold value for distinguishing between the recordable optical discs and the read-only optical discs.

Furthermore, in the event that there is large eccentricity in an optical disc, reproduction linear velocity changes due to the eccentricity. Then, the results of period measurement greatly vary according to phase of eccentricity, and setting of judgment threshold value becomes still more difficult or in some cases, becomes impossible.

SUMMARY OF THE INVENTION

It is an object of the present invention to achieve type judgment of discs at high reliability irrespective of presence of information record or magnitude of disc eccentricity.

A reproduction apparatus judges a type of an optical disc to reproduce information recorded on tracks of the optical disc. The disc is classified as a type of read-only optical discs whose tracks are formed with pits and as a type of recordable optical discs whose tracks are formed with wobbling grooves. The apparatus includes a motor adapted to rotate the optical disc, a head operable to irradiate the tracks of the optical disc rotated by the motor with an optical beam and output two detection signals corresponding to reflected light from the optical disc, and a controller operable to judge the type of the optical disc according to changes of a period of a specific signal contained in a push-pull signal generated from the two detection signals by varying a rotating speed of the motor.

The controller judges types of discs according to changes of periods of a specific signal contained in a push-pull signal generated from two detection signals by varying the motor rotating speed. In the event that push-pull signals contain the wobbling component which can be detected only in the case of recordable optical discs, measured periods vary in accordance with changes of motor rotating speed, it becomes easy to set a judgment threshold value and a disc can be distinguished at high reliability.

A reproduction method and a computer program of the present invention judge type of an optical disc to reproduce information recorded on tracks of the optical disc, the optical disc being classified as a type of read-only optical discs whose tracks are formed with pits and as a type of recordable optical discs whose tracks are formed with wobbling grooves. The method and the computer program include rotating the optical disc, irradiating the tracks of the rotated optical disc with an optical beam, generating two detection signals corresponding to reflected light from the optical disc, and judging the type of the optical disc according to changes of a period of a specific signal contained in a push-pull signal generated from the two detection signals by varying a rotating speed of the optical disc.

BRIEF DESCRIPTION OF THE DRAWINGS

The above and other objects and features of the present invention will become clear from the subsequent description of a preferred embodiment thereof made with reference to the accompanying drawings, in which like parts are designated by like reference numerals and in which.

DETAILED DESCRIPTION OF THE PREFERRED EMBODIMENTS

Figure 1:
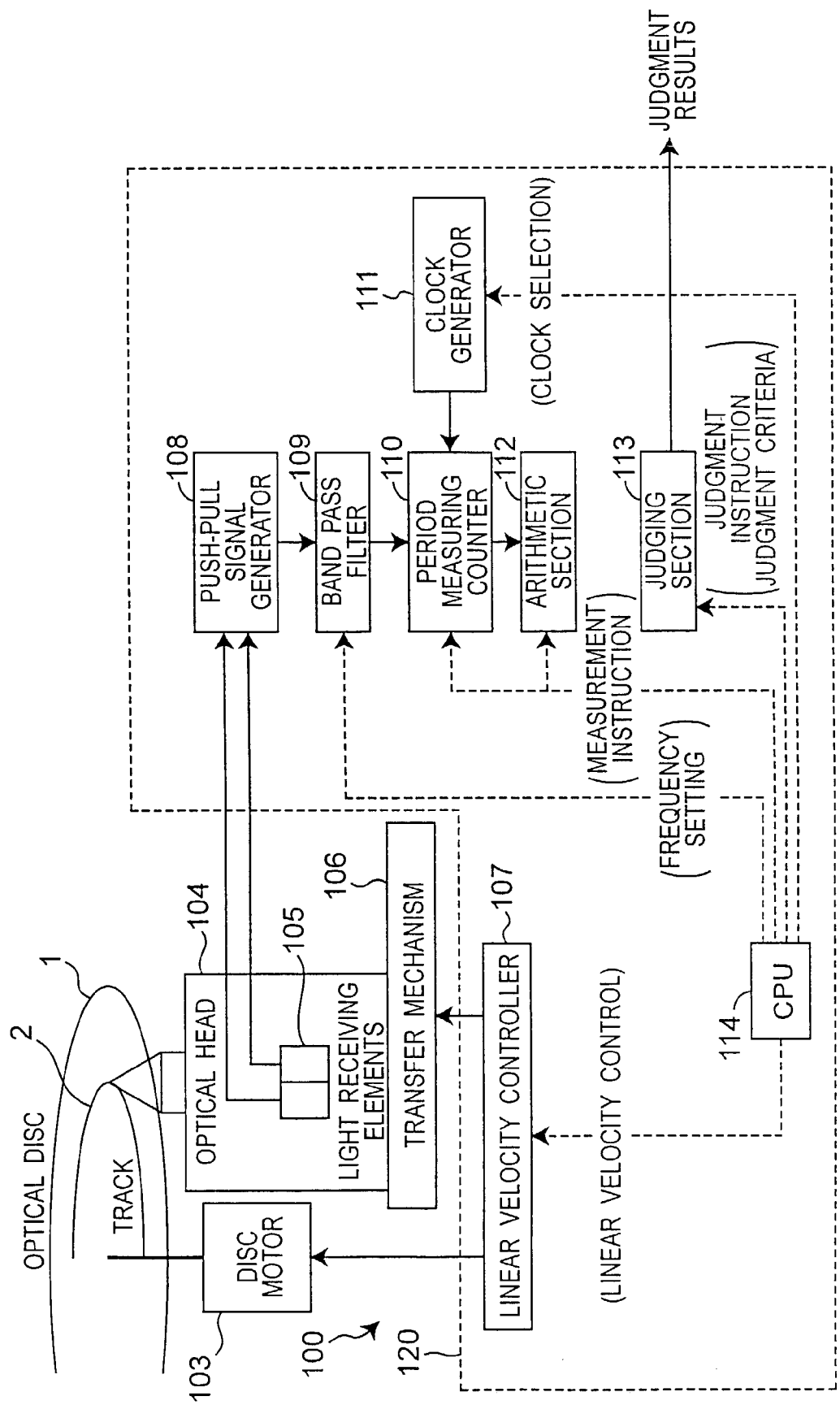
FIG. 1 is a block diagram showing a configuration of a reproduction apparatus of embodiment 1.

Referring now to the drawings attached, preferred embodiments 1 and 2 of the present invention will be described as follows. In the following embodiment 1, optical disc 1 is rotated at a linear velocity different from that used at standard-velocity reproduction and a type of optical disc 1 is judged based on whether a frequency of a signal representing physical characteristics of optical disc 1 is shifted or not. The frequency is determined by periods of the signal counted by using measurement clocks of a fixed frequency. In embodiment 2, the frequency is determined by the period counted by using reproduction data clocks extracted from a reproduced data signal in place of the measurement clocks of the fixed frequency.

Before explaining each embodiment, optical discs referred to in the embodiments will be explained. Optical discs are classified into two types: read-only optical discs and recordable optical discs.

As physical characteristics of read-only optical discs, the read-only optical discs have pits and spaces arranged along one or more spiral data recording tracks. Information is recorded by using the pits and spaces.

On the other hand, as physical characteristics of recordable optical discs, the recordable optical discs have recording marks and spaces are arranged on spirally built grooves or lands intervened by grooves. Information is recorded by using the recording marks and spaces. Furthermore, grooves of recordable optical discs are formed with a wobble having a frequency some one-hundredth of the data reproduction velocity, and based on this frequency, recording clocks are generated. In addition, by the wobbling of the grooves, address information on the optical disc is also embedded. To more specifically explain, in the event that recordable optical discs are DVD-R/RW and DVD-RAM, the wobbling frequency of the groove is specified to $1/186$ of the data transmission rate. Consequently, in a case of standard-velocity reproduction of 27-MHz data transmission rate, the wobbling frequency is 145 KHz and a reproduction linear velocity is 3.6 m/sec.

The physical characteristics of the recordable optical discs differ from that of the read-only optical discs in that the recordable optical discs have wobbling data recording tracks. In the following embodiments, an optical disc is distinguished based on whether the disc is recordable or read-only by using the difference.

(Embodiment 1)

FIG. 1 is a block diagram showing a configuration of a reproduction apparatus 100 according to embodiment 1. Reproduction apparatus 100 detects whether a data recording track 2 on optical disc 1 wobbles or not and determines the type of optical disc 1. One primary feature of the present embodiment lies in rotating optical disc 1 at a linear velocity which is different from that at standard-velocity reproduction and determining the type of optical disc 1. This feature is based on a principle in that a signal component of a specific frequency contained in a push-pull signal has a frequency band that is shifted, if data recording track 2 wobbles, according to changes of the reproduction linear velocity of optical disc 1, and that is not shifted, if data recording track 2 does not wobble, even if the reproduction linear velocity of optical disc 1 is changed.

Reproduction apparatus 100 comprises a disc motor 103 which rotates optical disc 1, an optical head 104 which irradiates optical disc 1 with an optical beam and receives the reflected light, two light receiving elements 105 installed inside optical head 104, which receive the reflected light from optical disc 1, a transfer mechanism 106 which transfers optical head 104 in the radial direction of optical disc 1, and a controller 120.

Controller 120 of reproduction apparatus 100 controls reproduction of information recorded on optical disc 1. To be more specific, controller 120 controls rotating speed of disc motor 103, adjusts positions of optical head 104, and controls irradiating positions of the optical beam. In addition, based on the reflected light received at light receiving elements 105, controller 120 judges whether data recording track 2 exists on optical disc 1 or not, and determines the type of optical disc 1.

Furthermore, the specific configuration of controller 120 will be described. Controller 120 includes a linear velocity controller 107, a push-pull signal generator 108, a band pass filter 109, a period measuring counter 110, a clock generator 111, an arithmetic section 112, a judging section 113, and a central processing unit (CPU) 114.

First of all, CPU 114 totally controls operations of controller 120. That is, CPU 114 sends control signals to each element contained in controller 120 and controls each element based on the control signals. The control signals include, for example, drive signals for operating each element, and settings for setting parameters to each element. In detail, the control signals include linear velocity control signals to linear velocity controller 107, frequency settings to band pass filter 109, measurement start instructions to period measuring counter 110 and arithmetic section 112, a clock selection value to clock generator 111, and judgment start instructions and judgment reference values for judging section 113.

Next, description will be made on each element inside controller 120. Linear velocity controller 107 receives linear velocity control signals from CPU 114, drives disc motor 3 and transfer mechanism 6 based on the linear velocity control signals, and controls reproduction linear velocity. The reproduction linear velocity means a rotating speed in the radial direction of data recording track 2 which optical head 104 irradiates with an optical beam. In the linear velocity control signals, a target value of reproduction linear velocity is contained, and linear velocity controller 107 adjusts the reproduction linear velocity in such a manner as to bring it closer to the target value. The standard reproduction linear velocity is, for example, 3.6 m/sec.

Push-pull signal generator 108 generates a push-pull signal based on a difference between two output signals from two light receiving elements 105. In the event that optical disc 1 is recordable, that is, data recording track 2 wobbles, a wobbling frequency component is included in the push-pull signal. In this case, push-pull signal generator 108 outputs a sine-wave signal with a frequency of 145 KHz for standard reproduction linear velocity.

Figure 2:
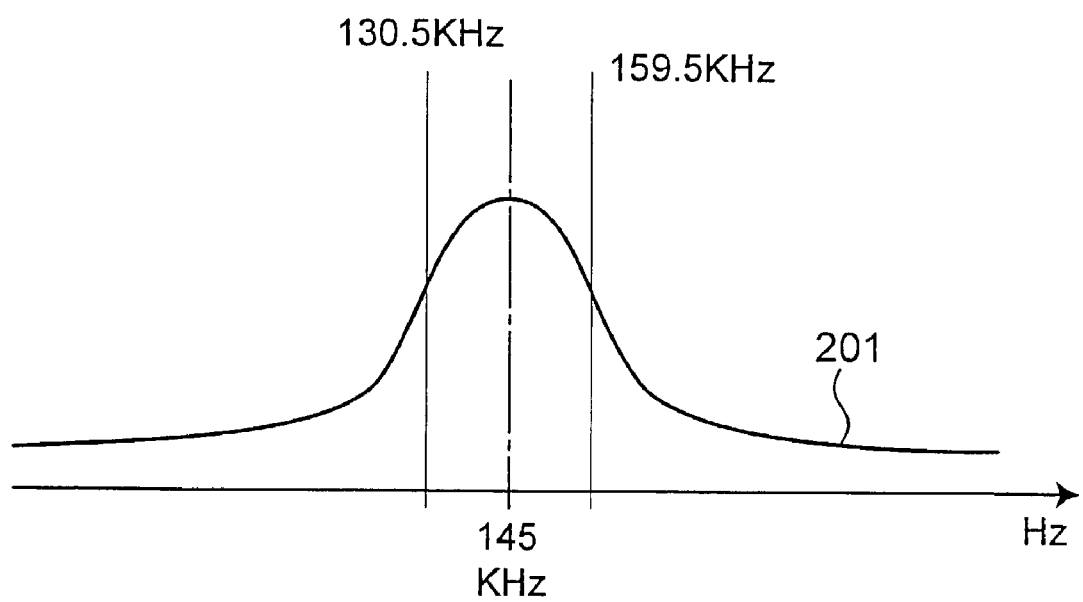
FIG. 2 is a diagram showing an example of frequency characteristics of a band pass filter.

Band pass filter 109 only passes the specified frequency component of push-pull signal outputted from push-pull signal generator 108. The frequency component which is allowed to pass is determined based on the frequency setting from CPU 114. FIG. 2 is a diagram showing an example of frequency characteristics 201 of band pass filter 109. In this example, the main pass band width is designed to be included in ±10% range centered around 145 KHz (that is, 130.5 to 159.5 KHz). Since noise components such as disc noise are superimposed to push-pull signals with high levels, the noises are removed by band pass filter 9 with the pass band centered around 145 KHz, which is the same as the wobbling frequency.

Referring again to FIG. 1, clock generator 111 generates measuring clocks. The clocks are defined based on the clock selection value from CPU 114. For example, at the standard-velocity reproduction in which data transfer rate is 27 MHz, clock generator 111 generates measuring clocks of 27 MHz frequency which is equal to the data transfer rate. The frequency of the measuring clocks is fixed.

Period measuring counter 110 measures periods of output signals from band pass filter 109. For the measurement, the measurement clocks generated by clock generator 111 are used. The reason why each period is measured is that measuring the period could identify the signal frequency because the frequency can be obtained as a reciprocal of the period. When period measuring counter 110 receives measuring clocks of 27 MHz frequency from clock generator 111 and at the same time receives sine wave signals of 145 KHz frequency from band pass filter 109, the output period is generally 186. However, in actuality, due to errors, etc., the output varies around 186.

Arithmetic section 112 provides arithmetic processing to the periodic data measured by period measuring counter 110. Judging section 113 determines based on the judgment criteria given from CPU 114 and arithmetic results of arithmetic section 112 whether optical disc is recordable or read-only. The specific arithmetic and judgment procedures will be described in detail as follows together with the operation of reproduction apparatus 100.

Figure 3:
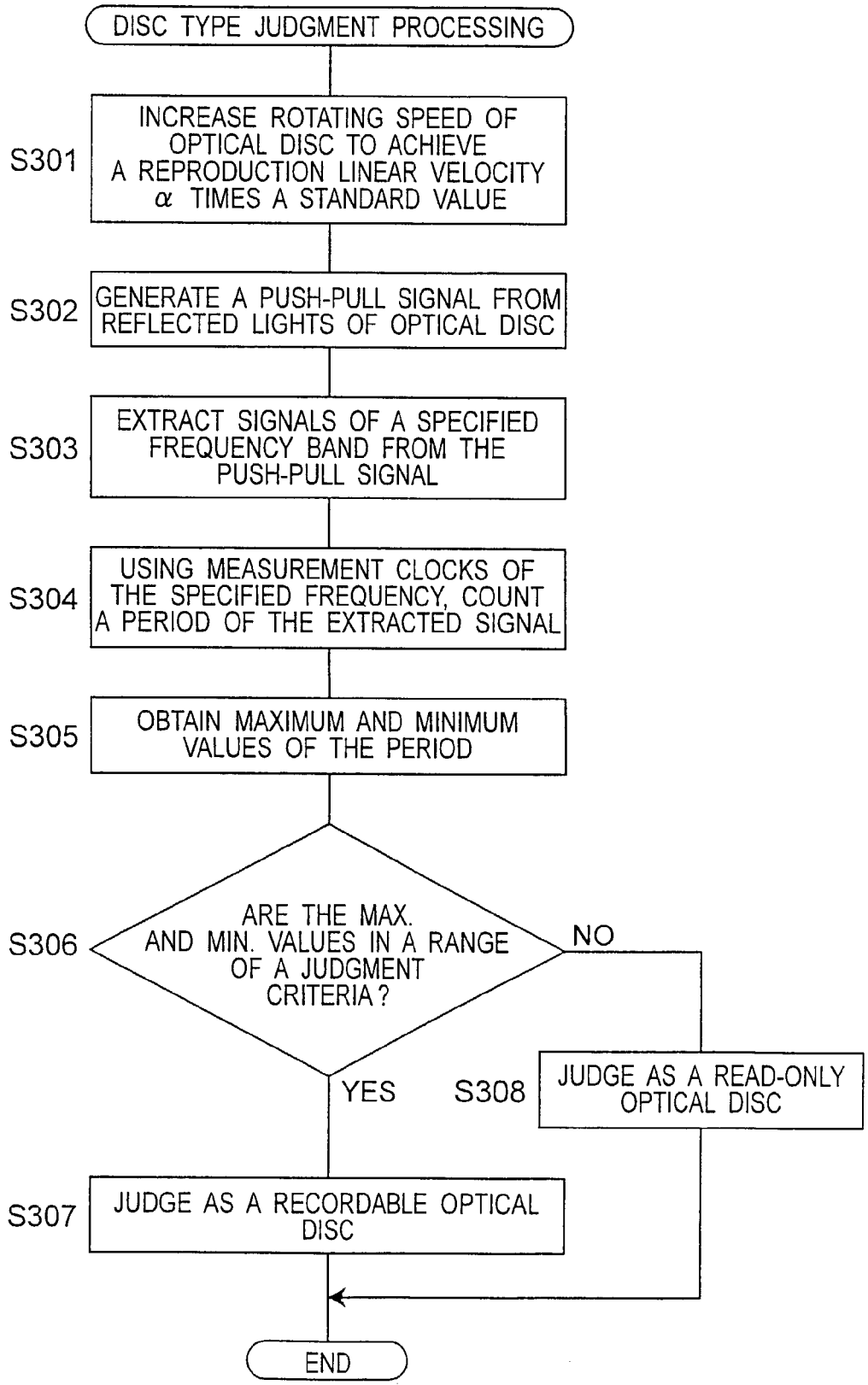
FIG. 3 is a flow chart showing a processing operation of the reproduction apparatus according to embodiment 1.

FIG. 3 is a flow chart showing the processing operation of reproduction apparatus 100 (FIG. 1) according to embodiment 1. First of all, CPU 114 (FIG. 1) sends linear velocity control signals to linear velocity controller 107 and changes reproduction linear velocity, optical dick rotating speed, to α times the standard value (Step S301 ). For example, let α=1.1, then, the reproduction linear velocity becomes 3.96 m/sec, which is 10% higher than the 3.6 m/sec standard value. Thereafter, optical head 104 irradiates optical disc 1 with the optical beam, and the reflected light is detected at two light-receiving elements 105. Based on the signal from each light-receiving element 105, push-pull signal generator 108 (FIG. 1) generates push-pull signals (Step S302 ).

In the event that optical disc 1 is recordable, that is, data recording track 2 wobbles, push-pull signal generator 108 outputs signals containing 159.5 KHz frequency sine wave signals as main components. To be more specific, a tracking frequency band for data recording track 2 of the optical beam is 8 KHz or lower, which is sufficiently low with respect to the wobbling frequency of data recording track 2. Consequently, when data recording track 2 wobbles, push-pull signal generator 108 outputs signals containing a sine-wave signal with a frequency of 159.5 KHz as a main component as tracking error signals due to wobbling of data recording track 2. This frequency is 10% higher than the wobbling frequency (145 KHz) when the reproduction linear velocity is a standard value. On the other hand, in the event that optical disc 1 is read-only, push-pull signal generator 108 outputs simple noise signals such as disc noise, etc. which do not contain a signal with a frequency of 159.5 KHz as a main component.

Thereafter, band pass filter 109 extracts signals of the specified frequency band from push-pull signals (step S303). Band pass filter 109 is designed to have a main pass band width included in ±10% range centered around 145 KHz. Consequently, in the case where optical disc 1 is recordable, band pass filter 109 outputs sine-wave signals whose main component is 159.5 KHz frequency when the push-pull signal passes band pass filter 109. On the other hand, in the case where optical disc 1 is read-only, signals centered around 130.5–159.5 KHz with small amplitudes and large jitters are outputted. Because the filter shown in FIG. 2 is designed to pass the 145 KHz frequency most preferentially, the frequency characteristics with frequency distributions centered around the 145 KHz frequency are obtained.

Figure 4:
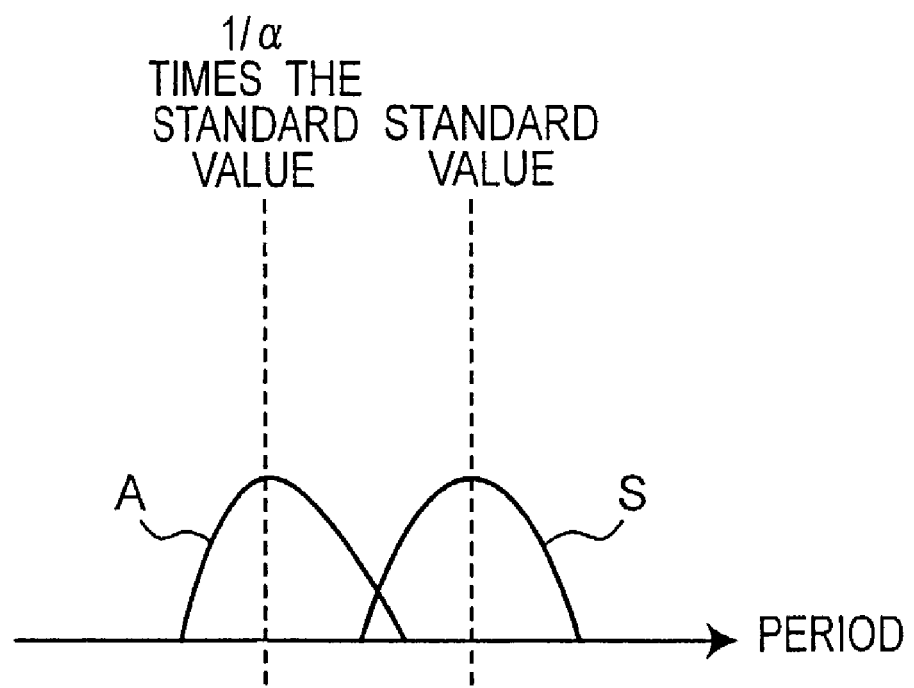
FIG. 4 is a diagram showing period count results of signals extracted by the band pass filter.

Next, period measuring counter 110 (FIG. 1) counts the period of the extracted signal (Step S304). FIG. 4 is a diagram showing the period count results of signals extracted by band pass filter 109. In the figure, the period count is expressed by a continuous curve, but in actual counting, it can be expressed as a histogram of count values counted according to specific frequencies. The abscissa of the diagram is periods. Since the frequency and the period are reciprocals of each other, a period of a signal which has frequency $\alpha$ times the standard value becomes $1/\alpha$ times. Curve S of FIG. 4 shows a period distribution of the read-only optical disc. Curve A shows a period distribution of the recordable optical disc. As clear from the graphs, by multiplying the reproduction linear velocity by $\alpha$, the recordable optical disc is shifted to another period distribution $1/\alpha$ lower than the initial distribution. However, the read-only optical disc keeps providing the same period distribution having standard values set as a reference. When $\alpha=1.1$ and measuring clocks of 27 MHz are supplied from clock generator 111 (FIG. 1), the recordable optical disc is shifted to a period distribution with count values 169, which is about 0.91 times the standard count value 186 and the read-only optical disc provides a period distribution scattering around the standard count value 186. Consequently, if the period distribution is varied when the reproduction linear velocity is varied, it can be said that optical disc 1 is a recordable optical disc.

In order to judge the type of optical disc 1 by utilizing this difference of distributions, maximum and minimum values of distributions are used in this case. Referring now to FIG. 3, arithmetic section 112 (FIG. 1) finds the maximum and the minimum values of the period by using the count results (Step S305). Thereafter, judging section 113 (FIG. 1) determines whether the maximum and the minimum values found are included in a range of judgment criteria (Step S306).

Figure 5A:
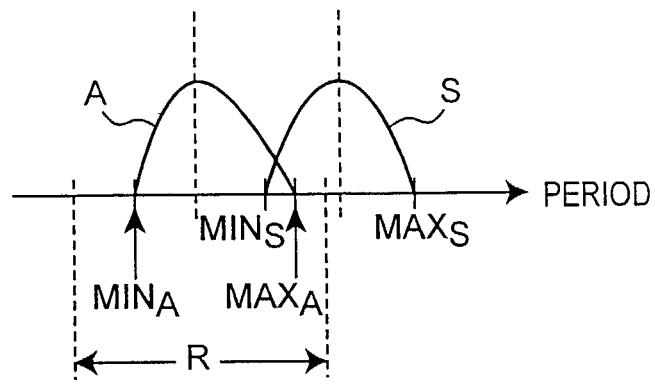
FIG. 5A is a diagram showing a range that serves as a criterion of type judgment based on a maximum and minimum values.

Now, processing utilizing the maximum and the minimum values of distributions will be described in more detail. FIG. 5A is a diagram showing range R which serves as a criterion of type judgment based on the maximum and the minimum values. Range R is decided by taking the distribution statistics of a plurality of recordable optical discs and read-only optical discs in advance when, for example, controller 120 (FIG. 1) is manufactured, and shifted period distributions and unshifted period distributions are defined distinctly. For example, in the event that frequency distributions of a recordable optical disc are distributed within the range of ±3% with the frequency 10% higher than, for example, the wobbling frequency (145 KHz) used as a reference, range R is generally defined as +7% to +13% of 145 KHz in terms of frequency and is generally defined as −13% to −7% of 186 in terms of count value. The maximum value of frequency of the read-only optical disc is never included in the range of this frequency (period).

Arithmetic section 112 identifies the maximum and the minimum values of the period based on count results of period measuring counter 110. When Curve S is obtained, maximum value $MAX_S$ and minimum value $MIN_S$ are identified. On the other hand, when curve A is obtained, maximum value $MAX_A$ and minimum value $MIN_A$ are identified.

Then, judging section 113 determines whether or not both maximum and minimum values obtained are included in the predetermined range R. In the figure, it is understood that a pair of ($MAX_A$, $MIN_A$) is included in range R and a pair of ($MAX_S$, $MIN_S$) is not included in range R.

As a result of the determination, if the maximum and the minimum values of the period distributions are included in range R, it can be determined that in optical disc 1 that corresponds to the period distribution, wobbling frequency is included. Consequently, it is judged that the optical disc 1 is recordable (step S307 of FIG. 3). Conversely, when the maximum and the minimum values of period distribution are not included in range R, it is judged that optical disc 1 is read-only (step S308). According to the judgment method of embodiment 1, since the determination range should be set to distributions with different center frequencies, it can be set extremely easily and it is not subject to jitters, etc. when optical discs are reproduced. Furthermore, it is not subject to abnormal distributions, etc. by noise and highly reliable judgment of the type of optical disc 1 can be carried out.

Figure 5B:
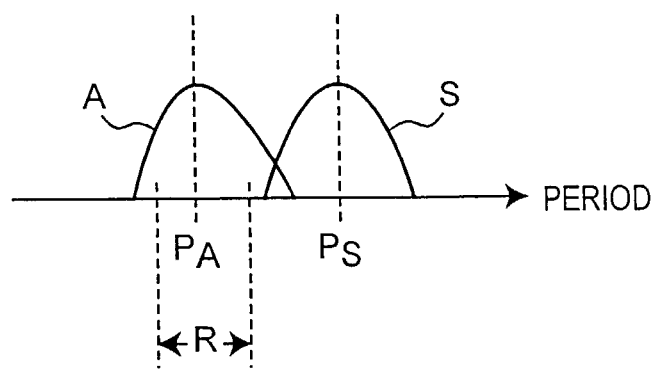
FIG. 5B is a diagram showing a range that serves as a criterion of type judgment based on an average of period.

Note that, in the above-mentioned description, arithmetic section 112 found the maximum and the minimum values of period and judging section 113 determined whether or not the maximum and minimum values of the period are included in the specified range R. However, for a first modification example, it is possible to determine the range R by using averages of periods, in place of using the maximum and the minimum values of the periods. FIG. 5B is a diagram showing a range that serves as a criterion of type judgment based on the average of the period. This range R has the shifted period distribution and unshifted period distribution distinctly defined by statistically calculating, etc.

Arithmetic section 112 finds averages of periods based on the count result of period measuring counter 110. The average of period is obtained by, for example, (period value)*(count value of the period)/(total of count values). When curve S is obtained, average $P_S$ is identified. On the other hand, when curve A is obtained, average $P_A$ is identified.

Then, the judging section 113 determines whether or not the averages obtained are included in predetermined range R. In the figure, it is understood that average $P_A$ is included in range R and average $P_S$ is not included in range R.

By using the first modification example, a second modification example will be further described. In the second modification example, after finding period distributions by varying reproduction linear velocity, the reproduction linear velocity is further varied twice, and three times stepwise. When averages of each period distribution change according to changes of the reproduction linear velocity, the disc is judged as recordable, and when changes are not observed nearly at the same value, the disc is judged as read-only.

Figure 5C:
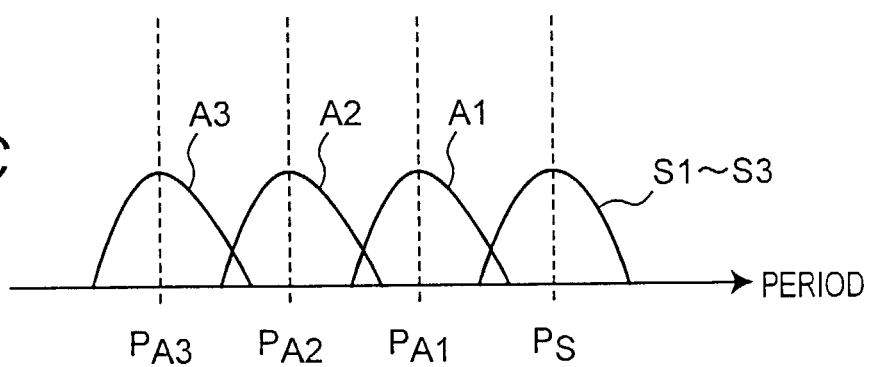
FIG. 5C is a diagram showing period distributions of recordable optical discs and period distributions of read-only optical discs when reproduction linear velocity is varied stepwise.

FIG. 5C is a diagram showing a period distribution of recordable optical discs and a period distribution of read-only optical discs when reproduction linear velocity is varied stepwise. Assume that the reproduction linear velocity is multiplied by $\alpha_1$, $\alpha_2$, and $\alpha_3$ stepwise ($1<\alpha_1<\alpha_2<\alpha_3$). As shown in the figure, whether or not the reproduction linear velocity is changed, period distributions of read-only optical discs are scarcely changed. When the average of period distributions discussed in the first modification example is found, the average is nearly constant value $P_S$. On the other hand, period distributions of recordable optical discs undergo a transition according to the changes. The averages of period distributions are inversely proportional to the rate of change of reproduction linear velocity. Specifically, when the reproduction linear velocity is multiplied by $\alpha_1$, it changes to the average value $P_{A1}$ which is multiplied by $1/\alpha_1$ from the average of the period distribution of the standard speed, when the reproduction linear velocity is multiplied by $\alpha_2$, it changes to average value $P_{A2}$ which is multiplied by $1/\alpha_2$ from the average of the period distribution of the standard speed, and when the reproduction linear velocity is multiplied by $\alpha_3$, it changes to average value $P_{A3}$ which is multiplied by $1/\alpha_3$ from the average of the period distribution of the standard speed.

In this way, when arithmetic section 112 calculates the average that corresponds to changes of reproduction linear velocity and the average value changes inversely according to the results, judging section 113 judges that optical disc 1 is recordable. If the average value is nearly constant, judging section 113 judges that optical disc 1 is read-only. According to the second modification example, the type of optical discs can be judged without defining range R shown in FIGS. 5A and 5B.

Multipliers $\alpha_1$, $\alpha_2$, etc. may take various values other than the above examples. Now, a case in which the reproduction linear velocity is changed 0.9 times and 1.1 times stepwise from the standard velocity will be described. In the above examples, $\alpha_1<1<\alpha_2$. Assume that band pass filter 109 (FIG. 1) has frequency characteristics 201 (FIG. 2).

First, disc motor 103 rotates optical disc 1 at the first reproduction linear velocity of 3.24 m/sec which is 10% lower than the standard reproduction linear velocity of 3.6 m/sec. Then, when data recording track 2 wobbles, push-pull signal generator 108 outputs a push-pull signal which includes a sine wave signal with a frequency of 130.5 KHz as a main component. When data recording track 2 does not wobble, push-pull signal generator 108 outputs simple noise signals of disc noise, etc. This noise signal includes simple noise components only even at 145 KHz frequency.

Band pass filter 109 extracts above-mentioned sine wave signals from this push-pull signal and period measuring counter 110 measures the period distribution. When data recording track 2 wobbles, the period distribution exhibits a profile in which curve A is moved symmetrically with respect to curve S in FIG. 5A. Arithmetic section 112 calculates the average of the period distribution to output the first arithmetic result. Because a central frequency of the period distribution is 130.5 KHz, when 27 MHz clocks are supplied from clock generator 111, the first arithmetic result becomes 205. On the other hand, when data recording track 2 does not wobble, curve S in FIG. 5A is obtained, in which the first arithmetic result is 186.

Then, disc motor 103 rotates optical disc 1 at the second reproduction linear velocity of 3.96 m/sec, which is 10% higher than the standard reproduction linear velocity of 3.6 m/sec. This is the same as what has been explained in relation to FIG. 3, and the description is omitted. Arithmetic section 112 calculates the average of period distribution to calculate the second arithmetic result. The second arithmetic result is 169 when data recording track 2 wobbles and 186 when it does not wobble.

The ratio of the first measurement result of 205 to the second measurement result 169 (about 0.8) when data recording track 2 wobbles is generally equal to the reciprocal of the ratio of the first reproduction linear velocity 3.24 to the second reproduction linear velocity 3.96. On the other hand, when data recording track 2 does not wobble, the ratio of the first measurement result 304 to the second measurement result 304 (1) cannot be said to be equal to a reciprocal of the ratio of the first reproduction linear speed 3.24 to the second reproduction linear velocity 3.96.

Therefore, judging section 113 is designed to determine whether or not the ratio of the first measurement result to the second measurement result is equal to the reciprocal of the ratio of the first reproduction linear velocity to the second reproduction linear velocity. As a result, if the ratio of the first measurement result to the second measurement result is generally equal to a reciprocal of the ratio of the first reproduction linear velocity to the second reproduction linear velocity, it is judged that optical disc 1 is recordable. If it is not equal, it is judged that optical disc 1 is read-only. Note that the above-mentioned term "generally" means to be within the range of, for example, ±5%.

In the present embodiment, by distinguishing between optical discs making the best of relative changes of linear velocities and period measurement results, distinction with still higher reliability can be achieved with respect to variations of absolute values of linear velocities.

(Embodiment 2)

In embodiment 2, a procedure for determining the type of optical disc 1 by using standard reproduction linear velocity (3.6 m/sec) will be described.

Figure 6:
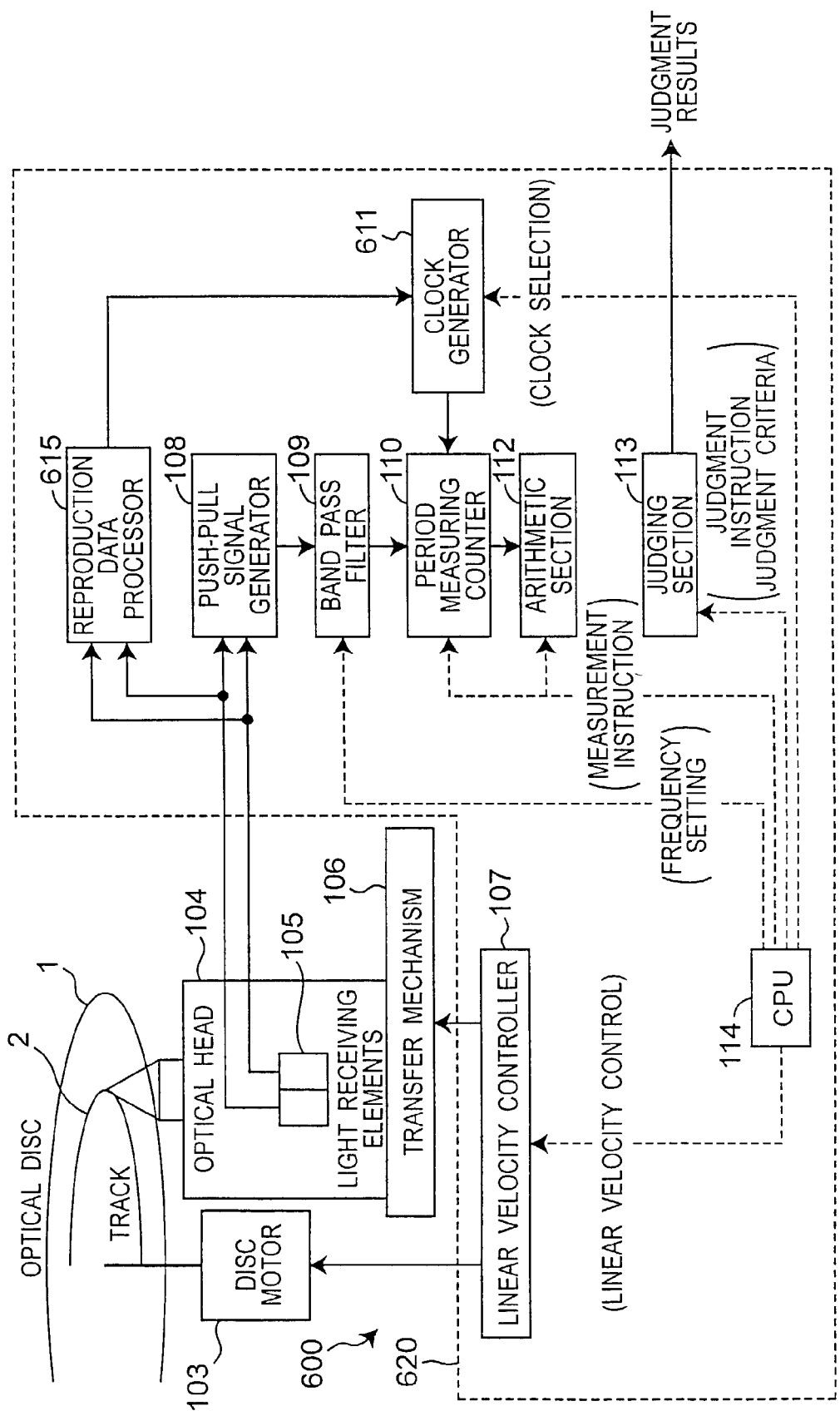
FIG. 6 is a block diagram showing a configuration of a reproduction apparatus according to embodiment 2.

FIG. 6 is a block diagram showing a configuration of a reproduction apparatus 600 according to embodiment 2. In embodiment 2, what differs the configuration of reproduction apparatus 600 from that of reproduction apparatus 100 (FIG. 1) is a controller 620. Furthermore, what differs the configuration of controller 620 from that of controller 120 (FIG. 1) is a reproduction data processing section 615 and in that clock generator 611 generates measuring clocks based on the data clocks from reproduction data processor 615. For the rest of the other configuration, each component of embodiment 2 has the same functions and operations with those of reproduction apparatus 100 (FIG. 1), and their descriptions will be omitted.

As shown in FIG. 6, reproduction data processor 615 receives signals from each one of light-receiving elements 105 and extracts reproduction data clocks from a reproduction data signal, which is obtained as a sum signal of these two received signals. Clock generator 611 divides, or utilizes as it is, the reproduction data clocks from reproduction data processor 615 and generates measurement clocks and sends them to period measuring counter 110. Period measuring counter 110 counts periods utilizing the measurement clocks. The generated measurement clocks have a frequency of, for example, 27 MHz, which is equal to the data transfer rate.

What must be taken into account is that since the reproduction data clocks track changes of the linear velocity, the clocks generated by using the reproduction data clocks can follow changes of the linear velocity. Therefore, even when variations of linear velocity control occurs due to eccentricity, it is possible to count the period constantly following that the variation and errors of measurement results can be suppressed to small ranges.

Now, by the standard reproduction linear velocity (3.6 m/sec), a procedure for judging a type of optical disc 1 will be described. As explained in embodiment 1, when data recording track 2 wobbles, push-pull signal generator 108 outputs the push-pull signal containing a sine wave of frequency equal to 145 KHz wobbling frequency. Because noise components such as disc noise are superimposed at a high level, the noise components are removed by band pass filter with the pass band centered around 145 KHz, which is the same as the wobble frequency, and the signal with the noise components removed is entered in period measuring counter 110. On the other hand, when data recording track 2 does not wobble, push-pull signal generator 108 outputs simple noise signals of disc noise, etc. This noise signal only includes a simple noise component even at 145 KHz frequency.

Outputs from push-pull signal generator 108 are input to period measuring counter 110 with signals having frequencies around 145 KHz extracted by band pass filter 109. Although the noise signals after passing band pass filter 109 are composed of signals with frequencies around 145 KHz, the noise signals have small signal amplitudes and large jitters. The reason why the signals have such characteristics is that noise signals with low signal amplitudes and wide frequency bands inevitably provide small signal amplitudes and large jitters as a result that a certain allowance (for example, ±10%) is provided for the pass band of band pass filter 109 with errors of linear velocity control taken into account.

Since the signal frequency entered in period measuring counter 110 is 145 KHz when data recording track 2 wobbles, the period count result is ideally 186. However, due to influences such as noise, the actual period measurement result varies in a small range centered around 186. This is an effect of the reproduction data clocks which vary according to tracking changes of linear velocity as described above. On the other hand, in the case of noise signals, the values with still greater variations are obtained as compared to the case in which data recording track 2 wobbles. Therefore, in the present embodiment, whether or not data recording track 2 wobbles is determined based on this variation and the type of optical disc 1 is determined.

Figure 7A:
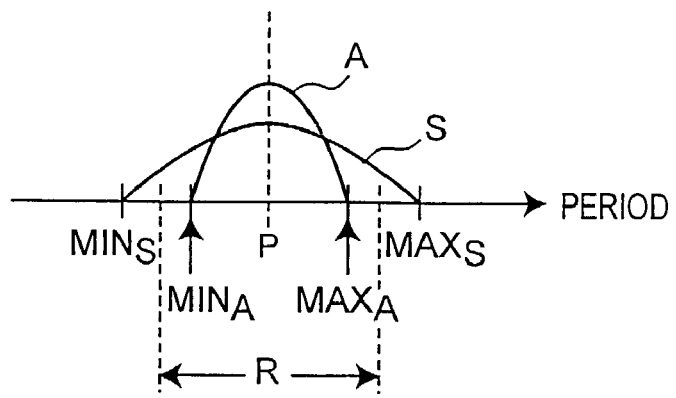
FIG. 7A is a diagram showing range R that serves as a criterion of type judgment based on maximum and minimum values.

FIG. 7A is a diagram showing range R that serves as a criterion of type judgment based on the maximum and the minimum values. Period distribution S when data recording track 2 does not wobble provides greater variations as compared to period distribution A when data recording track 2 wobbles. Consequently, what is required is to place attention to the maximum and the minimum values of period distribution.

Arithmetic section 112 finds the maximum and the minimum values of obtained period distribution. Judging section 113 determines whether or not the maximum and the minimum values are included in the specified range R. The specified range R is, for example, within ±5% of standard count value of 186. If the maximum and the minimum values are included in this range R, judging section 113 determines that data recording track 2 wobbles at 145 KHz and, as a result, judges that optical disc 1 is a recordable disc. On the other hand, if the maximum and the minimum values are not included in range R, judging section 113 determines that data recording track 2 does not wobble and that judges that optical disc 1 is a read-only optical disc.

Figure 7B:
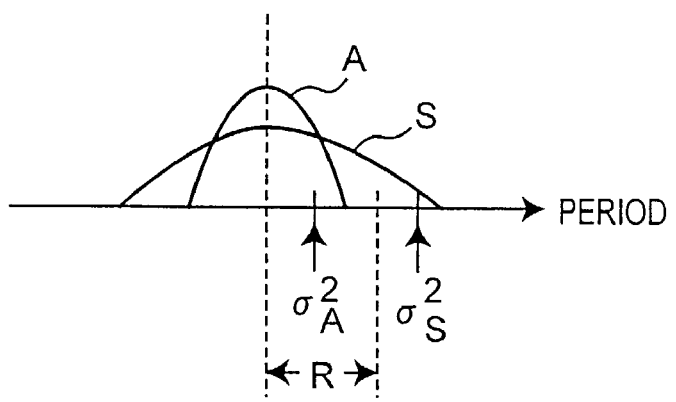
FIG. 7B is a diagram showing range R that serves as a criterion of type judgment based on dispersion $\sigma^2$ of period distributions.

Arithmetic section 112 and judging section 113 can determine the type of optical disc 1 even based on other parameters. First, for a first modification example, description will be made of an example in which the type of optical disc is determined using dispersion of period distributions. FIG. 7B is a diagram showing range R that serves as a criterion of type judgment based on dispersion $\sigma^2$ of period distributions. Arithmetic section 112 finds dispersion $\sigma^2$ of period distributions by Eq. 1.

[Eq. 1]

$$\sigma^2 = \frac{1}{N}\sum_{k=1}^{N}(x_k - P)^2$$

where, N represents total counts, and P is an average of the period distribution. As a result, judging section 113 determines that the dispersion is dispersion $\sigma_A^2$ of period distribution A when data recording track 2 wobbles, and it judges that optical disc 1 is recordable. On the other hand, when dispersion $\sigma^2$ is not included in the specified range R, judging section 113 determines that the dispersion is dispersion $\sigma_S^2$ of period distribution A when data recording track 2 does not wobble, and judges that optical disc 1 is read-only. Range R is, for example, within ±5% of the average value. It is also possible to determine by using standard deviation $\sigma$ obtained as a square root of dispersion.

By carrying out statistical processing of period measurement data, reliability of judgment results can be improved with respect to sporadic abnormal periodic data due to defects.

Now, description will be made on judgment based on the maximum, minimum, and average values of periods as a second modification example. Arithmetic section 112 calculates a ratio of the maximum and the minimum values to the average value after calculating the maximum and the minimum values of the periods and average value of the periods. Judging section 113 judges that optical disc 1 is recordable if the ratio is within the specified range (for example, 0.95–1.05). Conversely, if the ratio exceeds the range, the judging section judges that optical disc 1 is read-only. Thus, it is possible to suppress variations of period measurement data by errors of linear velocity and improve the reliability of judgment results.

Next, discussion will be made on the judgment based on the dispersion and average value of period distributions as a third modification example. Arithmetic section 112 calculates dispersion of period distributions and average value of period distributions by Eq. 1 and calculates a ratio of dispersion to the average value. Judging section 113 may judge that optical disc 1 is a recordable optical disc if the ratio is included in the specified range (for example, 0.95–1.05). Conversely, if the ratio exceeds this range, the judging section judges that optical disc 1 is read-only. Therefore, it is possible to suppress variations of period measurement data by errors of linear velocity and at the same time, by carrying out statistical processing of period measurement data, reliability of judgment results can be improved with respect to sporadic abnormal periodic data due to defects.

Lastly, for a fourth modification example, judgment based on the standard deviation and average value of period distributions will be described. Arithmetic section 112 calculates standard deviations and average values of the period distributions, and calculates each ratio of the standard deviation to the average value. Judging section 113 may judge that optical disc 1 is recordable if the ratio is included in the specified range (for example, 0.95–1.05). Conversely, if the ratio exceeds the range, the judging section judges that optical disc 1 is read-only. Therefore, it is possible to suppress variations of period measurement data by errors of linear velocity and at the same time, by carrying out statistical processing of period measurement data, reliability of judgment results can be improved with respect to sporadic abnormal periodic data due to defects.

As described above, embodiments of the present invention have been explained.

In embodiment 2, the type of optical disc was distinguished by the standard reproduction linear velocity only. However, by using reproduction apparatus 600 (FIG. 6) of embodiment 2, judgment explained in the description of the embodiment may be carried out.

To be more specific, it is also possible to judge the type of optical disc 1 by using the reproduction data clocks which reproduction data processor 615 (FIG. 6) extracted from reproduction data signals, rotating optical disc 1 at linear velocity different from that for standard velocity reproduction, and finding out whether the frequency of the signal representing physical characteristics of the optical disc is shifted or not. Combining in this way, the period distributions when data recording track 2 wobbles have the measurement results of distributions constantly centered around 186. Consequently, even if there are variations in reproduction linear velocity due to eccentricity or control errors, it is not necessary to adjust the distinguished value, and judgment results with high reliability can be obtained. Judging section 113 may determine that data recording track 2 wobbles when the maximum and the minimum values of period measurement results are included in the specified range, or may determine by the average value of period measurement results which is about 186.

Figure 8:
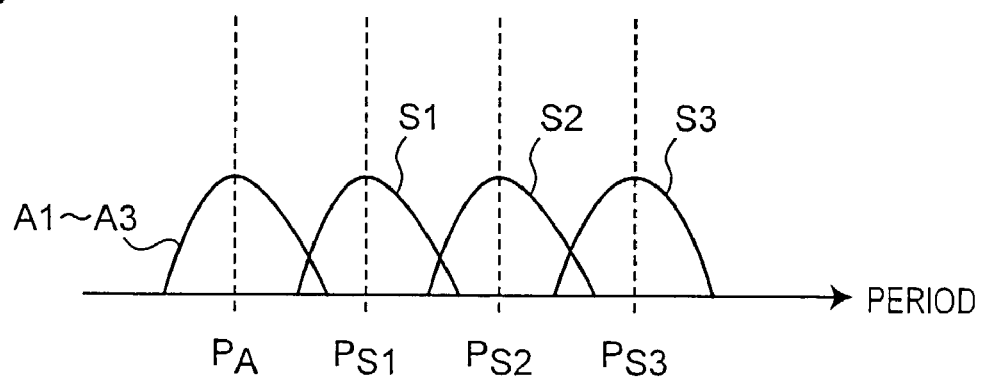
FIG. 8 is a diagram showing period distributions A1–A3 of recordable optical discs and period distributions S1–S3 of read-only optical discs when reproduction linear velocity is varied stepwise.
Figure 9:
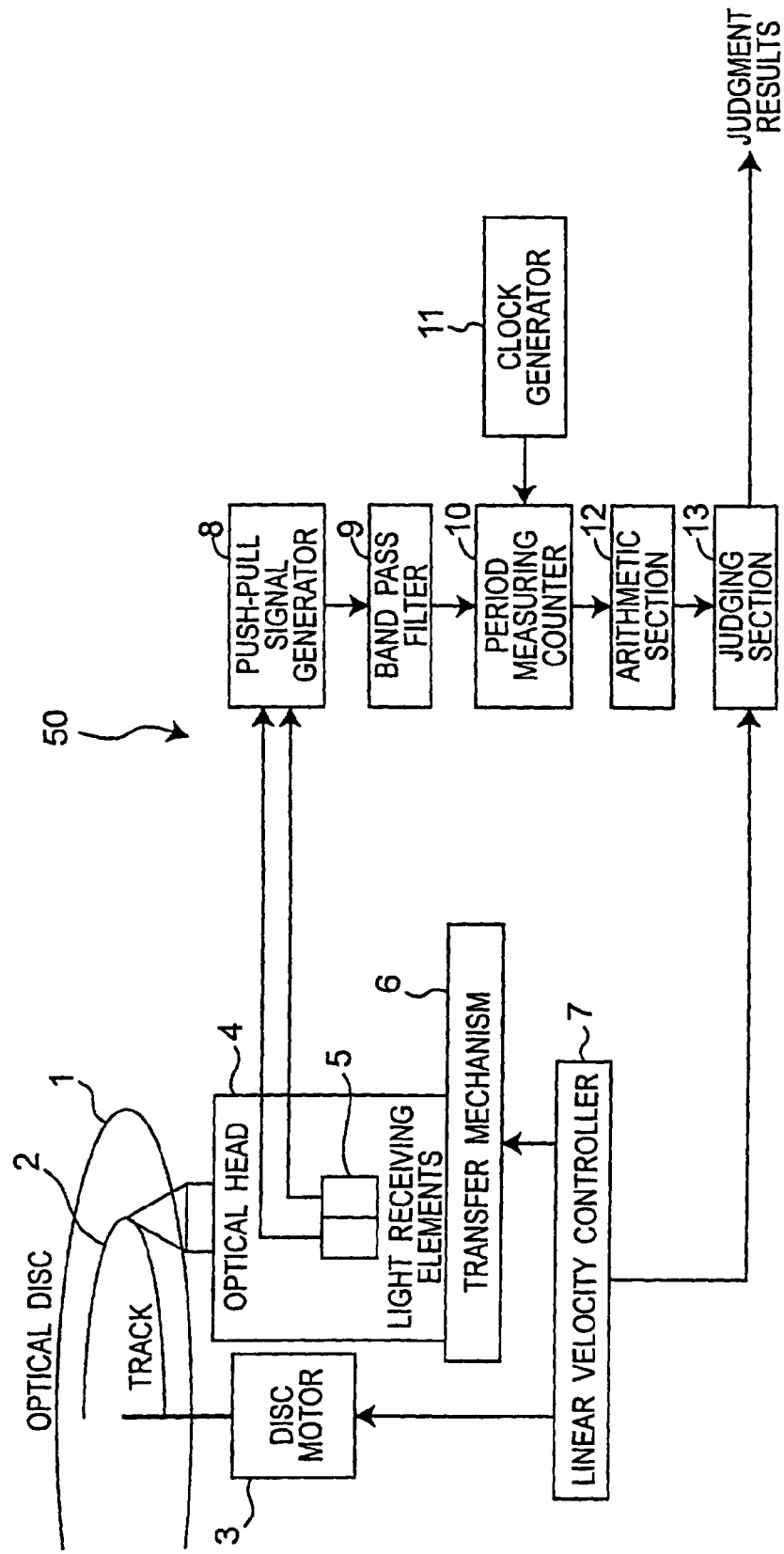
FIG. 9 is a diagram showing a configuration of a conventional reproduction apparatus.

Alternatively, reproduction apparatus 600 (FIG. 6) according to embodiment 2 may carry out judgment based on stepwise changes of reproduction linear velocity explained as a modification example of embodiment 1. FIG. 8 is a diagram showing period distributions A1–A3 of recordable optical discs and period distributions S1–S3 of read-only optical discs when reproduction linear velocity is varied stepwise.

In this example, assume that the reproduction linear velocity is multiplied by $\alpha_1$, $\alpha_2$, and $\alpha_3$ stepwise ($1<\alpha_1<\alpha_2<\alpha_3$). As shown in the figure, period distributions A1–A3 of recordable optical discs are scarcely changed before and after the reproduction linear velocity is changed. The average is nearly constant value $P_A$. This is because the period of data recording track 2 can be constantly detected in synchronism with the wobbling period of data recording track 2 as the period is counted using the reproduction data clocks. On the other hand, period distributions of read-only optical discs undergo a transition according to the changes. The average of period distributions is proportional to the rate of change of reproduction linear velocity. Specifically, when the reproduction linear velocity is multiplied by $\alpha_1$, it changes to average value $P_{S1}$ which is multiplied by $\alpha_1$ from the average of period distributions of the standard speed, when the reproduction linear velocity is multiplied by $\alpha_2$, it changes to average value $P_{S2}$ which is multiplied by $\alpha_2$ from the average of period distributions of the standard speed, and when the reproduction linear velocity is multiplied by $\alpha_3$, it changes to average value $P_{S3}$ which is multiplied by $\alpha_3$ from the average of period distributions of the standard speed.

In this way, when arithmetic section 112 calculates the average that corresponds to changes of reproduction linear velocity and the average value changes proportionally according to the results, judging section 113 judges that optical disc 1 is read-only one. When the average value is nearly constant, judging section 113 judges that optical disc 1 is recordable one.

Reproduction apparatus 100 (FIG. 1) and reproduction apparatus 600 (FIG. 6) described above operate based on computer readable program code of a computer program embodied on a computer readable medium for use with a computer which defines the operation based on the flow chart shown in, for example, FIG. 3. Consequently, the present invention can take a form of such computer program.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reproduction apparatus for judging a type of an optical disc to reproduce information recorded on tracks of the optical disc, the optical disc being classified as a type of read-only optical discs whose tracks are formed with pits or as a type of recordable optical discs whose tracks are formed with wobbling grooves, the reproduction apparatus comprising:

a motor adapted to rotate the optical disc;

an optical head operable to irradiate the tracks of the optical disc rotated by said motor with an optical beam, the optical head including two light receiving elements positioned in a radial direction of the optical disc to receive a reflected light of the optical beam from the optical disc and output two detection signals corresponding to the reflected light;

a push-pull signal generator operable to generate a push-pull signal from the two detection signals;

a band pass filter operable to extract a wobbling signal indicative of wobbling components of the wobbling grooves from the push-pull signal; and a controller operable to judge the type of the optical disc based on whether or not a period of the wobbling signal changes with varying a rotating speed of said motor.

2. The reproduction apparatus according to claim 1, wherein said controller comprises:

a control section operable to change a linear velocity of the tracks by controlling the rotating speed of said motor;

a counter operable to output the period of the wobbling signal extracted by said band pass filter based on clocks of a fixed frequency; and a judging section operable to judge that the optical disc is recordable when the period of the wobbling signal outputted from said counter is changed according to a change of the linear velocity and judge that the optical disc is read-only when the period of the wobbling signal is constant before and after the change of the linear velocity.

3. The reproduction apparatus according to claim 2, further comprising an arithmetic section operable to calculate a maximum value and a minimum value of the period of the wobbling signal, wherein said judging section is operable to determine that the period of the wobbling signal is changed according to the change of the linear velocity when the maximum value and the minimum value calculated by said arithmetic section are included in a specified range.

4. The reproduction apparatus according to claim 2, further comprising an arithmetic section operable to calculate an average value of the period of the wobbling signal,
wherein said judging section is operable to determine that the period of the wobbling signal is changed according to the change of the linear velocity when the average value calculated by said arithmetic section is included in a specified range.

5. The reproduction apparatus according to claim 2, further comprising an arithmetic section operable to calculate an average value of the period of the wobbling signal,
wherein said control section is operable to change the linear velocity of the tracks a plurality of times,
wherein said arithmetic section is operable to calculate the average value of the period of the wobbling signal every time said control section changes the linear velocity, and
wherein said judging section is operable to determine that the period of the wobbling signal is changed according to changes of the linear velocity when each average value obtained by said arithmetic section is inversely proportional to a rate of changes of the linear velocity.

6. The reproduction apparatus according to claim 1, wherein said controller comprises:
a control section operable to control the rotating speed of said motor and vary a linear velocity of the tracks;
a reproduction data processor operable to generate a reproduction data signal from a sum of the two detection signals;
a counter operable to output a period of the wobbling signal extracted by said band pass filter based on clocks of a frequency of the reproduction data signal outputted from said reproduction data processor; and
a judging section operable to judge that the optical disc is recordable when the period of the wobbling signal outputted from the counter is constant before and after a change of the linear velocity and judge that the optical disc is read-only when the period of the wobbling signal changes according to the change of the linear velocity.

7. The reproduction apparatus according to claim 6, further comprising an arithmetic section operable to calculate an average value of the period of the wobbling signal,
wherein said control section is operable to vary the linear velocity of the tracks a plurality of times,
wherein said arithmetic section is operable to calculate an average of the period of the wobbling signal every time said control section varies the linear velocity, and
wherein said judging section is operable to determine that the period of the wobbling signal changes according to changes of the linear velocity when each average value obtained by said arithmetic section is constant.

8. The reproduction apparatus according to claim 6, further comprising an arithmetic section operable to calculate one of a dispersion value and a standard deviation of the period of the wobbling signal,
wherein said judging section is operable to determine that the period of the wobbling signal changes according to changes of the linear velocity when one of the dispersion value and the standard deviation is included in a specified range.

9. A reproduction method for judging a type of an optical disc to reproduce information recorded on tracks of the optical disc, the optical disc being classified as a type of read-only optical discs whose tracks are formed with pits or as a type of recordable optical discs whose tracks are formed with wobbling grooves, said reproduction method comprising:
rotating the optical disc;
irradiating the tracks of the rotated optical disc with an optical beam;
generating two detection signals corresponding to reflected light by receiving the optical beam reflected from the optical disc using two light receiving elements positioned in a radial direction of the optical disc;
generating a push-pull signal from the two detection signals:
extracting a wobbling signal indicative of wobbling components of the wobbling grooves from the push-pull signal using a band pass filter; and
judging the type of the optical disc based on whether or not a period of the wobbling signal changes with varying a rotating speed of the optical disc.

10. A computer program embodied on a computer readable medium for use with a computer for judging a type of an optical disc to reproduce information recorded on tracks of the optical disc, the optical disc being classified as a type of read-only optical discs whose tracks are formed with pits or as a type of recordable optical discs whose tracks are formed with wobbling grooves, said computer program comprising:
computer readable program code operable to cause the optical disc to rotate;
computer readable program code operable to cause irradiation of the tracks of the rotated optical disc with an optical beam;
computer readable program code operable to cause generation of two detection signals corresponding to reflected light from the optical disc using two light receiving elements positioned in a radial direction of the optical disk;
computer readable program code operable to cause generation of a push-pull signal from the two detection signals;
computer readable program code operable to cause extraction of a wobbling signal indicative of wobbling components of the wobbling grooves from the push-pull signal using a band pass filler; and
computer readable program code operable to judge the type of the optical disc based on whether or not a period of the wobbling signal changes with varying a rotating speed of the optical disc.

11. The reproduction apparatus according to claim 1, wherein said controller is operable to judge the type of the optical disc based on whether or not a rate of change of the rotating speed of said motor corresponds to a rate of change of a frequency of the wobbling signal.

12. The reproduction apparatus according to claim 1, wherein said controller is operable to vary the rotating speed of said motor to be different than a standard reproduction speed of the optical disc.

13. The reproduction apparatus according to claim 1, wherein said controller is operable to vary the rotating speed of said motor within a range such that a frequency of the wobbling signal is within a pass band of said pass band filter.

* * * * *

UNITED STATES PATENT AND TRADEMARK OFFICE
CERTIFICATE OF CORRECTION

| | | |
|---|---|---|
| PATENT NO. | : 7,154,832 B2 | Page 1 of 1 |
| APPLICATION NO. | : 10/317042 | |
| DATED | : December 26, 2006 | |
| INVENTOR(S) | : Yoshihiro Kanda et al. | |

It is certified that error appears in the above-identified patent and that said Letters Patent is hereby corrected as shown below:

Claim 9
In column 16, claim 9, lines 13-14, change "two detection signals:" to --two detection signals;--.

Claim 10
In column 16, claim 10, line 45, change "band pass filler;" to --band pass filter;--.

Signed and Sealed this

Tenth Day of April, 2007

JON W. DUDAS
*Director of the United States Patent and Trademark Office*